(12) United States Patent
Vilas Boas et al.

(10) Patent No.: US 11,560,213 B2
(45) Date of Patent: Jan. 24, 2023

(54) DEVICES AND METHODS TO STRUCTURALLY CLOSE AND SEAL OPENINGS IN AN AIRCRAFT WING FUEL TANK

(71) Applicant: EMBRAER S.A., São José dos Campos (BR)

(72) Inventors: Alberto Vilar Vilas Boas, São José dos Campos (BR); Daniel Gonçalves Da Silva, Campinas (BR); Gustavo Dedding Martins, São José dos Campos (BR); Juliano De Oliveira, São José dos Campos (BR); Luciano Alves Martins, São José dos Campos (BR); Luiz Gustavo Suzuki, São José dos Campos (BR); Robson Garcia Correa, São José dos Campos (BR); Vitor Juliano Sampaio Soares, Ellington, CT (US); Wagner Garcez Verri, São José dos Campos (BR)

(73) Assignee: YABORÃ INDÚSTRIA AERONÁUTICA S.A., São José dos Campos (BR)

( * ) Notice: Subject to any disclaimer, the term of this patent is extended or adjusted under 35 U.S.C. 154(b) by 311 days.

(21) Appl. No.: 16/821,204

(22) Filed: Mar. 17, 2020

(65) Prior Publication Data
US 2020/0307766 A1    Oct. 1, 2020

Related U.S. Application Data

(60) Provisional application No. 62/827,327, filed on Apr. 1, 2019.

(51) Int. Cl.
*B64C 7/00* (2006.01)
*B64C 3/34* (2006.01)

(52) U.S. Cl.
CPC .  *B64C 7/00* (2013.01); *B64C 3/34* (2013.01)

(58) Field of Classification Search
CPC   B64C 3/18; B64C 3/182; B64C 3/187; B64C 3/34; B64C 7/00; B64D 37/005
See application file for complete search history.

(56) References Cited

U.S. PATENT DOCUMENTS

| 2,816,686 | A  | * | 12/1957 | Bradford | B64D 37/005 |
|---|---|---|---|---|---|
| | | | | | 220/681 |
| 7,202,321 | B2 | * | 4/2007 | Byrd | C08G 18/61 |
| | | | | | 428/447 |
| 8,167,245 | B1 | * | 5/2012 | Koehler | B64C 3/34 |
| | | | | | 244/135 R |
| 2004/0075027 | A1 | * | 4/2004 | Friddell | B64C 3/34 |
| | | | | | 244/135 R |

(Continued)

*Primary Examiner* — Tye William Abell
(74) *Attorney, Agent, or Firm* — Nixon & Vanderhye P.C.

(57) ABSTRACT

Closure devices and methods are provided for closing a stringer penetration space defined between a stringer and a wing rib of an aircraft wing section. According to certain embodiments, the closure devices will integrally include a forward face plate positioned in covering relationship to at least a portion of the stringer penetration space, and a rearwardly projecting attachment arm rigidly adapted for rigid attachment to the stringer so as to positionally fix the forward face plate relative to the stringer penetration space.

6 Claims, 4 Drawing Sheets

(56) References Cited

U.S. PATENT DOCUMENTS

| | | | |
|---|---|---|---|
| 2009/0258291 A1* | 10/2009 | Piszar | H01M 8/04201 429/185 |
| 2010/0107513 A1* | 5/2010 | Buchanan | B64C 3/18 52/84 |
| 2010/0294889 A1* | 11/2010 | Balsa Gonz Lez | B64C 3/34 244/131 |
| 2016/0355273 A1* | 12/2016 | Perez Diaz | B64C 3/34 |
| 2020/0164959 A1* | 5/2020 | Edwards | B64C 3/182 |
| 2020/0189715 A1* | 6/2020 | Yamaguchi | B64C 3/34 |

\* cited by examiner

DEVICES AND METHODS TO STRUCTURALLY CLOSE AND SEAL OPENINGS IN AN AIRCRAFT WING FUEL TANK

CROSS-REFERENCE TO RELATED APPLICATION

This application is based on and claims domestic priority benefits of U.S. Provisional Application Ser. No. 62/827,327 filed on Apr. 1, 2019, the entire contents of which are expressly incorporated hereinto by reference.

FIELD

The embodiments disclosed herein relate generally to aircraft wings having integral fuel tanks. More specifically, the embodiments disclosed herein relate to methods and devices whereby openings in an aircraft wing fuel tank may be structurally closed and sealed.

BACKGROUND

Modern aircraft employ so-called wet wings whereby compartments defined by wing ribs are configured to hold an on-board quantity of fuel. Aircraft wings will also necessarily include a variant of structural components with different geometries, such as stringers, spars, conduit fittings, skins and the like. Due to the geometric complexity of the wing structural parts, it is very difficult to comply with sealing requirements for a wing-internal fuel tank which typically leads to the use of excessive sealant.

It would therefore be highly desirable if closure devices and methods could be provided which alleviate the drawbacks of conventional sealing techniques for wing internal fuel tanks. It is towards providing such solutions that the embodiments of the herein described invention are directed.

SUMMARY

Generally, the embodiments disclosed herein are directed toward closure devices and methods for closing a stringer penetration space defined between a stringer and a wing rib of an aircraft wing section. According to certain embodiments, the closure devices will integrally include a forward face plate positioned in covering relationship to at least a portion of the stringer penetration space, and a rearwardly projecting attachment arm rigidly adapted for rigid attachment to the stringer so as to positionally fix the forward face plate relative to the stringer penetration space.

The forward face plate may include a central plate portion and at least one other plate portion angularly oriented with respect to the central plate portion. For example, the face plate may include upper and lower plate portions that are each angularly oriented, e.g., in opposite directions, with respect to the central plate portion.

Once positioned in covering relationship with the stringer penetration space, a conventional sealant may be applied about the peripheral edges of the face plate.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
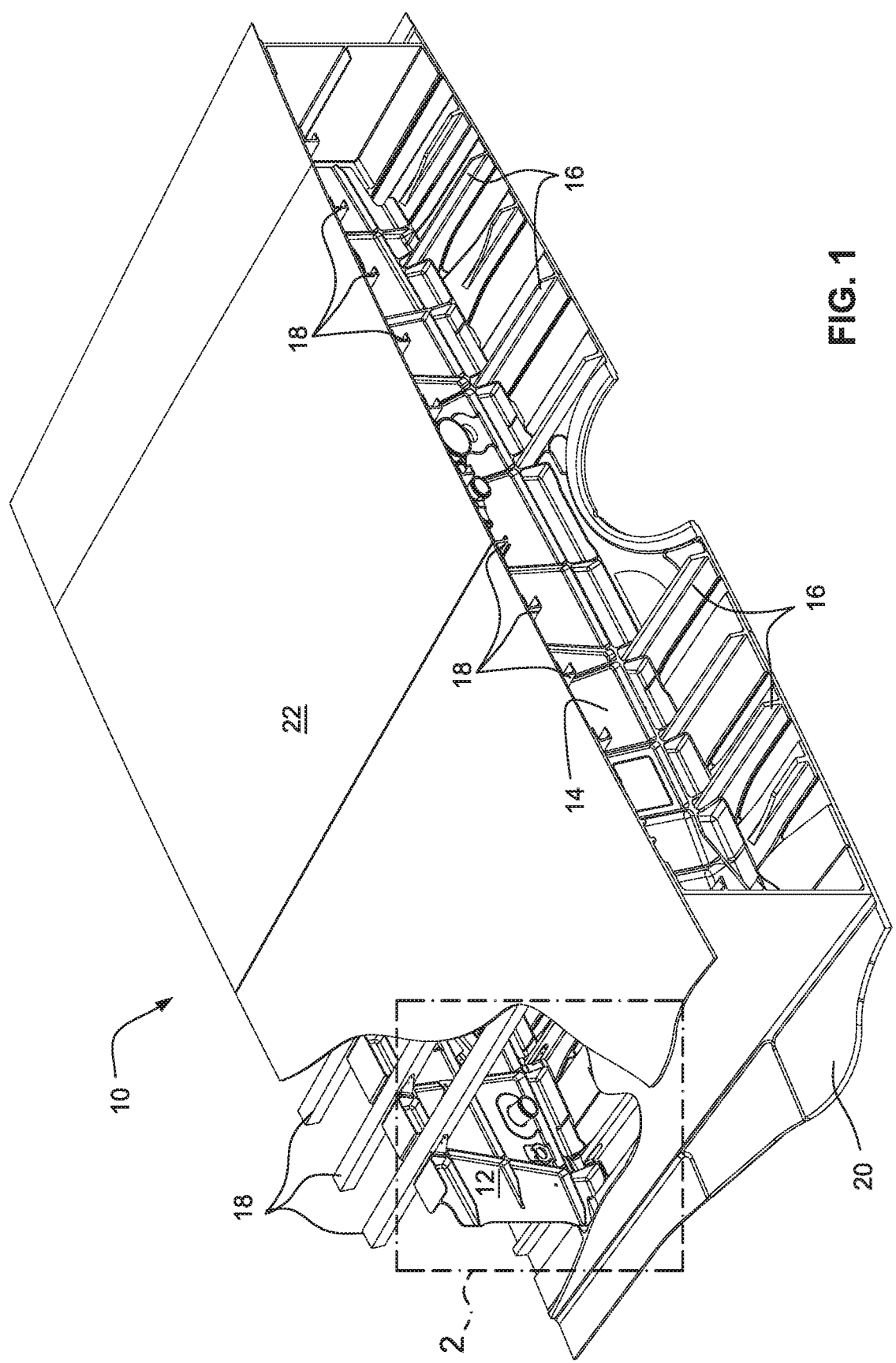
FIG. 1 is a perspective view of an aircraft wing section containing a fuel tank compartment in which the structural closure devices of the embodiments described herein are employed.
Figure 2:
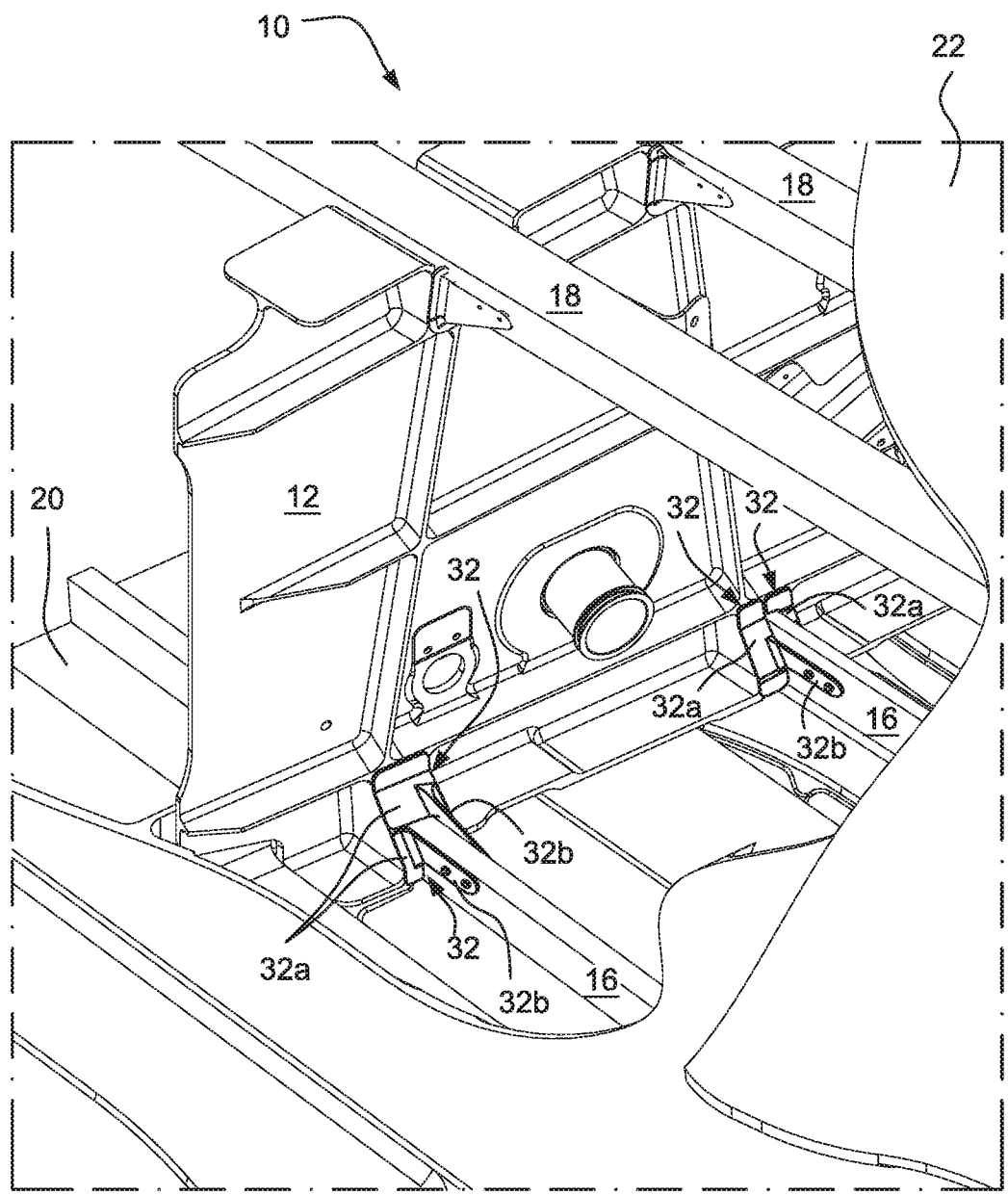
FIG. 2 is an enlarged view of an exemplary portion of the aircraft wing fuel tank as outlined in FIG. 1.
Figure 3:
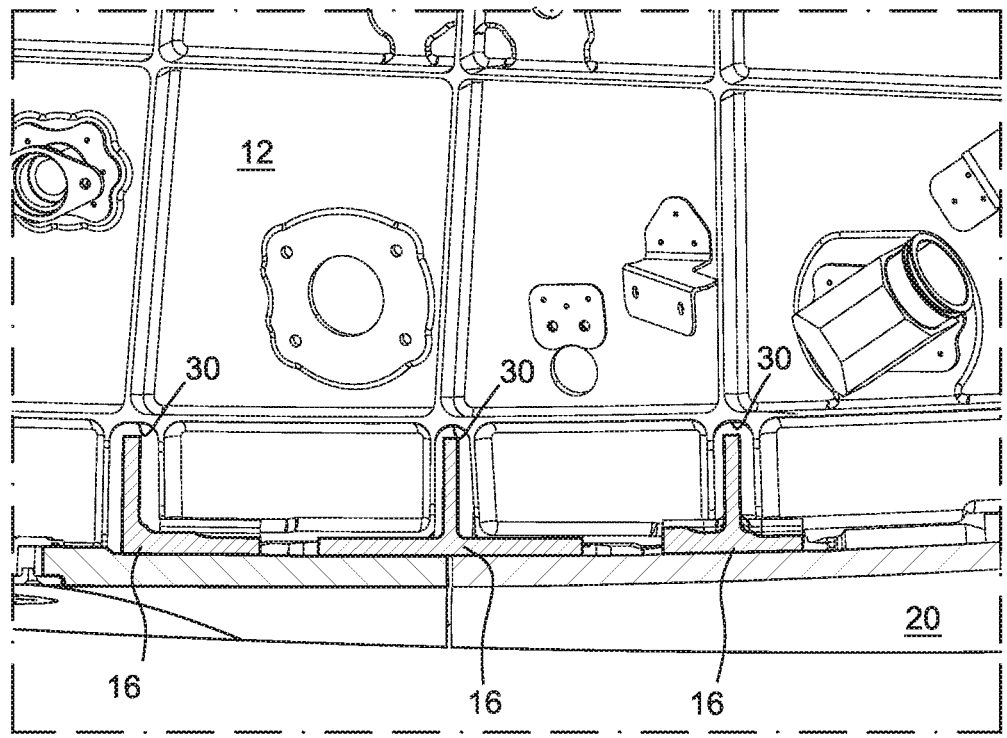
FIGS. 3 and 4 are elevational views of an exemplary portion of the wing fuel tank depicted in FIG. 1 and depicting the fuel tank without and with the closure devices installed, respectively.

Accompanying FIG. 1 depicts an exemplary section of an aircraft wing 10 having spaced apart wing ribs 12, 14 extending in a generally longitudinal direction of the aircraft between the leading and trailing edges (not shown) of the wing 10. As is conventional, the wing 10 is also provided with a series of lower and upper stringers 16, 18 that extend generally spanwise along the wing substantially transverse to the ribs 12, 14. Lower and upper wing skins 20, 22 are in turn fixed to the stringers 16, 18, respectively, and the ribs 12, 14 so as to establish the aerodynamic profile of the wing section 10. The internal volume defined between the wing ribs 12, 14 and the lower and upper wing skins 20, 22 will therefore contain an on-board quantity of fuel for the aircraft.

As shown in FIGS. 2-5 the areas where the stringers 16, 18 penetrate through the wing rib 12 require openings defining a space 30 (see FIG. 3) which is closed by way of closure devices 32 in accordance with the present invention. It will be observed that the devices 32 may be geometrically configured differently from one another so as to accommodate the geometries associated with the specific structural location in which the device 32 is positioned. Each of the devices 32 will however include a forward face plate 32a which overlaps at least a portion of the respective space 30 defined between a respective one of the wing ribs 12, 14 and a respective one of the stringers 16, 18.

In order to rigidly fix the closure device 32 relative to the respective space 30 which is covered by the face plate 32a, each closure device 32 will integrally include a rearwardly projecting attachment arm 32b. According to some embodiments the closure device 32 includes the forward face plate 32a and rearward attachment arm 32b as a one-piece structural component. The attachment arm 32b may therefore be rigidly attached to a respective one of the stringers 16, 18 by any suitable fixation device, e.g., rivets, screws, bolt/nut assemblies and the like.

Figure 4:
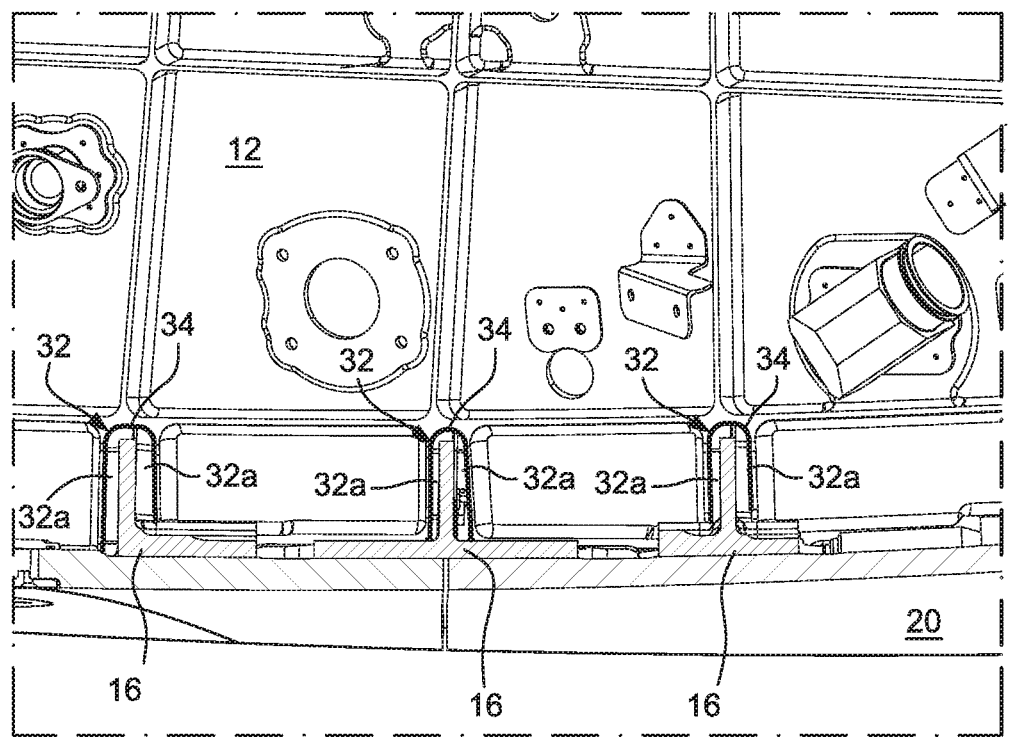
Figure 5:
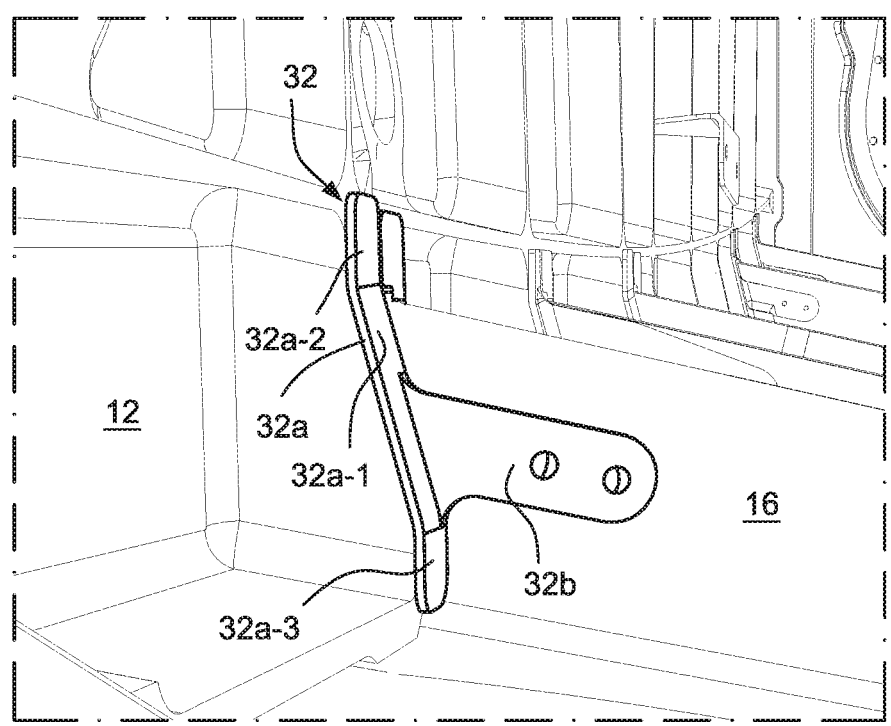
FIG. 5 is an enlarged perspective view of a portion of the fuel tank of FIG. 1 showing an exemplary closure device in accordance with an embodiment of the invention described herein.

The peripheral edge of the closure device 32 in the vicinity of the space 30 closed by the forward face plate 32a may therefore receive a conventional aircraft fuel tank sealant as shown by reference numeral 34 in FIG. 4. As can be appreciated, since the face plate 32 covers a substantial portion of the space 30, the amount of sealant 34 to seal the space against liquid (fuel) leakage can be minimized. As is seen, e.g., in FIG. 5, the forward face plate 32a may be provided with closure device 32 may be provided with a central plate portion 32a-1 and upper and lower plate portions 32a-2, 32a-3 which extend outwardly from the upper and lower edges of the central plate portion 32*a*-1, respectively, and which are angularly oriented with respect to the central plate portion 32*a*-1. More specifically, in the embodiment depicted as shown in FIG. 5, the upper and lower plate portions 32*a*-2, 32*a*-3 are angularly oriented in opposite directions relative to the central plate portion 32*a*-1 such that the upper plate portion 32*a*-2 is rearwardly inclined relative to the central plate portion 32*a*-1 and the lower plate portion 32*a*-3 is forwardly inclined relative to the central plate portion 32*a*-1. As is also shown in FIG. 5, the face plate 32*a*, including the central portion 32*a*-1 and the upper and lower portions 32-*a*2, 32-*a*3 therefore, respectively, are positioned against but are structually unconnected to the rib 12.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A closure device for closing a stringer penetration space defined between a stringer and a wing rib of an aircraft wing section, wherein the closure device integrally comprises:
    (a) a forward face plate positioned so as to be structurally unattached to the wing rib in covering relationship to at least a portion of the stringer penetration space; and
    (b) an attachment arm rigidly adapted for rigid structural attachment to the stringer so as to positionally fix the forward face plate relative to the stringer penetration space, wherein
        the forward face plate includes (i) a central plate portion, (ii) an upper plate portion extending from an upper edge of the central plate portion, and (iii) a lower plate portion extending from a lower edge of the central plate portion, and wherein
        the attachment arm extends rearwardly from the central plate portion of the forward face plate, and wherein
        the upper and lower plate portions are angularly oriented in opposite directions relative to the central plate portion such that the upper plate portion is oriented in a rearwardly inclined direction relative to the central plate portion and the lower plate portion is oriented in a forwardly inclined direction relative to the central plate portion.

2. A method of sealing a stringer penetration space defined between a stringer and a wing rib of an aircraft wing section comprising:
    (i) rigidly fixing the attachment arm of the closure device according to claim 1 to the stringer such that the forward face plate is positioned in covering relationship to at least a portion of the stringer penetration space; and
    (ii) applying an aircraft sealant around a peripheral edge of the forward face plate.

3. A fuel tank section of an aircraft wing comprising:
    a pair of spaced-apart wing ribs extending in a direction between leading and trailing edges of the aircraft wing;
    stringers extending in a spanwise direction through the wing ribs and defining therebetween stringer penetration spaces with the wing ribs;
    upper and lower wing skins attached to the wing ribs and stringers; and
    closure devices closing the stringer penetration spaces defined between the stringers and the wing ribs, wherein each of the closure devices is the closure device according to claim 1, wherein
    the attachment arm of the each closure device is rigidly fixed to an adjacent one of the stringers such that the forward face plate is positioned so as to be structurally unattached to the adjacent one of the wing ribs in covering relationship to a respective one of the stringer penetration spaces.

4. The fuel tank section according to claim 3, further comprising a sealant applied about a peripheral edge of the forward face plate.

5. An aircraft wing which comprises the fuel tank section according to claim 3.

6. An aircraft which comprises the aircraft wing according to claim 5.

* * * * *